US012227658B2

(12) United States Patent
Choi et al.

(10) Patent No.: US 12,227,658 B2
(45) Date of Patent: Feb. 18, 2025

(54) INK COMPOSITION, WINDOW USING THE SAME, AND MANUFACTURING METHOD OF WINDOW USING THE SAME

(71) Applicant: Samsung Display Co., LTD., Yongin-si (KR)

(72) Inventors: Ji Won Choi, Pyeongtaek-si (KR); Dongho Kim, Hwaseong-si (KR); Dongwoon Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/129,121

(22) Filed: Mar. 31, 2023

(65) Prior Publication Data

US 2023/0235188 A1 Jul. 27, 2023

Related U.S. Application Data

(62) Division of application No. 16/864,238, filed on May 1, 2020, now Pat. No. 11,634,600.

(30) Foreign Application Priority Data

May 2, 2019 (KR) .................. 10-2019-0051318

(51) Int. Cl.
*C09D 11/102* (2014.01)
*B41M 1/34* (2006.01)
(Continued)

(52) U.S. Cl.
CPC ............ *C09D 11/107* (2013.01); *B41M 1/34* (2013.01); *B41M 7/009* (2013.01); *C03C 17/32* (2013.01);
(Continued)

(58) Field of Classification Search
CPC ....................................................... B41M 1/34
See application file for complete search history.

(56) References Cited

U.S. PATENT DOCUMENTS 8,199,284 B2 6/2012 Kang et al.
11,041,088 B2 6/2021 Kim et al.
(Continued)

FOREIGN PATENT DOCUMENTS

CN 1786089 A 6/2006
CN 104672366 A 6/2015
(Continued)

OTHER PUBLICATIONS

"Curing of epoxy oligomers by isocyanates," Kadurina et al., Polymer, 1992, vol. 33, No. 18 (Year: 1992).*
(Continued)

*Primary Examiner* — Ian A Rummel
(74) *Attorney, Agent, or Firm* — CANTOR COLBURN LLP

(57) ABSTRACT

An ink composition includes an acrylic resin including a polymerization product of a first monomer having a hydroxyl group, a second monomer having an epoxy group, a third monomer having an acrylate group, and a fourth monomer having a substituted or unsubstituted phenyl group, a first curing agent having an isocyanate group, and a second curing agent having an amine group. Durability and abrasion resistance of a window may be improved.

13 Claims, 6 Drawing Sheets

(51) Int. Cl.
  *B41M 7/00* (2006.01)
  *C03C 17/32* (2006.01)
  *C08F 12/08* (2006.01)
  *C08F 16/26* (2006.01)
  *C08F 20/14* (2006.01)
  *C08F 20/28* (2006.01)
  *C08F 20/32* (2006.01)
  *C08F 212/08* (2006.01)
  *C08F 220/14* (2006.01)
  *C08F 220/20* (2006.01)
  *C08F 220/32* (2006.01)
  *C09D 11/107* (2014.01)
  *G02B 1/14* (2015.01)

(52) U.S. Cl.
  CPC ............ *C03C 17/326* (2013.01); *C08F 12/08* (2013.01); *C08F 16/26* (2013.01); *C08F 20/14* (2013.01); *C08F 20/28* (2013.01); *C08F 20/32* (2013.01); *C08F 212/08* (2013.01); *C08F 220/14* (2013.01); *C08F 220/20* (2013.01); *C08F 220/32* (2013.01); *C09D 11/102* (2013.01); *C03C 2218/119* (2013.01); *C03C 2218/32* (2013.01); *G02B 1/14* (2015.01)

(56) References Cited

U.S. PATENT DOCUMENTS

| | | | |
|---|---|---|---|
| 2003/0059618 A1* | 3/2003 | Takai | C08G 59/24 428/413 |
| 2010/0179294 A1 | 7/2010 | Kim et al. | |
| 2012/0088878 A1 | 4/2012 | Mestach et al. | |
| 2019/0248098 A1* | 8/2019 | Ozeki | B32B 3/02 |

FOREIGN PATENT DOCUMENTS

| | | |
|---|---|---|
| JP | 2019048988 A | 3/2019 |
| KR | 101056963 B1 | 8/2011 |
| KR | 10-20150051391 A | 5/2015 |
| KR | 20160124385 A | 10/2016 |
| KR | 20160137862 A | 12/2016 |
| KR | 10-20190026992 A | 3/2019 |

OTHER PUBLICATIONS

"Amine Cured Epoxy Coating," as retrieved from https://www.corrosionpedia.com/definition/6529/amine-cured-epoxy-coating, 2018 (Year: 2018).*

Cheng, Yuxiao, Inspection Technology and Supervision of Imported Paint Harmful Substances, Published Nov. 30, 2017, Related p. 76, 3 pp.

Cheng, Yuxiao, Inspection Technology and Supervision of Imported Paint Harmful Substances, Published Nov. 30, 2017, Related p. 76, 4 pp. (English Translation).

He, Hongwei, Modification of carbon fiber/epoxy resin composites, National Defense Industry Press, First Edition, Relative p. 23 Published, Nov. 30, 2014, 3 pp. (English Translation).

He, Hongwei, Modification of carbon fiber/epoxy resin composites, NationalDefense Industry Press, First Edition, Relative p. 23 Published, Nov. 30, 2014, 3 pp.

Office Action issued in Chinese Patent Application No. 202010356369.1, dated Oct. 14, 2022, 20 pp.

Shi, Hui, et al., Printing Technology Second Edition, Published Jul. 31, 2017, Jiangsu Phoenix Fine Arts Press Relative p. 23, 3 pp.

Shi, Hui, et al., Printing Technology Second Edition, Published Jul. 31, 2017, Jiangsu Phoenix Fine Arts Press Relative p. 23, 4 pp. (English Translation).

English Translation of Textbook: Chen, Kaixun; "New Field of Fine Chemical Engineering", First Ed., Mar. 3, 1999, China Petrochemical Press, p. 295.

Textbook: Chen, Kaixun; "New Field of Fine Chemical Engineering", First Ed., Mar. 3, 1999, China Petrochemical Press, p. 295.

* cited by examiner

INK COMPOSITION, WINDOW USING THE SAME, AND MANUFACTURING METHOD OF WINDOW USING THE SAME

CROSS-REFERENCE TO RELATED APPLICATIONS

This divisional application claims priority to U.S. patent application Ser. No. 16/864,238, filed May 1, 2020, now U.S. Pat. No. 11,634,600, and Korean Patent Application No. 10-2019-0051318, filed on May 2, 2019 in the Korean Intellectual Property Office, and all the benefits accruing therefrom under 35 U.S.C. §§ 119, 120, the contents of which in their entirety are herein incorporated by reference.

BACKGROUND

The present disclosure herein relates to an ink composition printed on a window, a window with the ink composition, and a manufacturing method of a window with the ink composition, and more particularly, to an ink composition having improved printing properties, barrier properties, chemical resistance, and abrasion resistance, and a window with a printed layer having improved chemical resistance and abrasion resistance.

In order to protect an outer surface of a display panel included in a display device, a window is provided on the display panel. The window providing the outer surface of the display device can directly influence the design of the display device. Accordingly, in order to protect the display panel and add various designs to the display device, the window may be printed with an ink and a pattern may be formed. In order to form a pattern on a window with a 3-dimensional structure of which edges have a curved shape, a process of laminating a film printed with ink on a window can be used, however such a lamination method can be complicated and workability is diminished.

SUMMARY

The present disclosure provides an ink composition having improved printing properties and reliability.

The present disclosure also provides a window including a printed layer having improved chemical resistance and abrasion resistance.

The present disclosure also provides a manufacturing method of a window which is printed with an ink having improved printing properties and reliability.

An embodiment of the inventive concept provides an ink composition including an acrylic resin including a polymerization of product of a first monomer having a hydroxyl group, a second monomer having an epoxy group, a third monomer having an acrylate group, and a fourth monomer having a substituted or unsubstituted phenyl group; a first curing agent having an isocyanate group; and a second curing agent having an amine group.

In an embodiment, the ink composition may further include an epoxy resin.

In an embodiment, the first monomer may be hydroxypropyl acrylate.

In an embodiment, the second monomer may be glycidyl methacrylate, glycidyl acrylate, or allyl glycidyl ether, or a combination thereof.

In an embodiment, the third monomer may be methyl methacrylate.

In an embodiment, the fourth monomer may be benzyl methacrylate, styrene, or t-butyl styrene, or a combination thereof.

In an embodiment, the acrylic resin may include, based on 100 moles of the acrylic resin, from about 10 moles to about 30 moles of the first monomer; from about 10 moles to about 20 moles of the second monomer; from about 20 moles to about 35 moles of the third monomer; and from about 20 moles to about 35 moles of the fourth monomer.

In an embodiment, the acrylic resin may be represented by the following Formula 1:

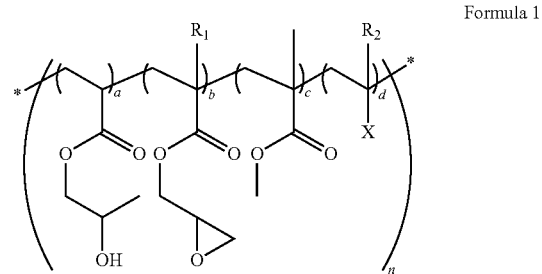

Formula 1

In Formula 1, a, c, and d are each independently an integer of 1 to 3, b is 1 or 2,

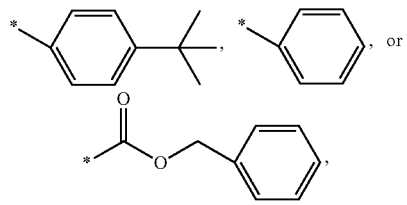

X is $R_1$ and $R_2$ are independently hydrogen or a methyl group, and n is an integer of 200 to 400.

In an embodiment, the acrylic resin may be a polymer resin having a weight average molecular weight of from about 20,000 grams/mole to about 40,000 grams/mole.

In an embodiment, the first curing agent may include two or more isocyanate groups, and the second curing agent may include two or more amine groups.

In an embodiment of the inventive concept, a window includes a base substrate including a flat area and at least one bent area neighboring, i.e., adjacent or in proximity to the flat area; and a printed layer disposed on a face of the base substrate and formed with an ink composition, wherein the ink composition includes an acrylic resin including a polymerization of product of a first monomer having a hydroxyl group, a second monomer having an epoxy group, a third monomer having an acrylate group, and a fourth monomer having a substituted or unsubstituted phenyl group; a first curing agent having an isocyanate group; and a second curing agent having an amine group.

In an embodiment, the ink composition may further include an epoxy resin.

In an embodiment, the first monomer may be hydroxypropyl acrylate, the second monomer may be glycidyl methacrylate, glycidyl acrylate, or allyl glycidyl ether, or a combination thereof, the third monomer may be methyl methacrylate, and the fourth monomer may be benzyl methacrylate, styrene, or t-butyl styrene, or a combination thereof.

In an embodiment, the acrylic resin may include from about 10 moles to about 30 moles of the first monomer; from about 10 moles to about 20 moles of the second monomer; from about 20 moles to about 35 moles of the third monomer; and from about 20 moles to about 35 moles of the fourth monomer, based on 100 moles of the acrylic resin.

In an embodiment, the acrylic resin may be represented by the following Formula 1:

Formula 1

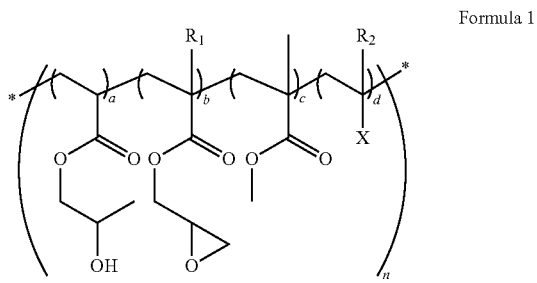

In Formula 1, a, c, and d are each independently an integer of 1 to 3, b is 1 or 2,

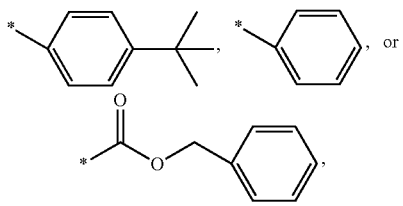

X is $R_1$ and $R_2$ are independently hydrogen or a methyl group, and n is an integer of 200 to 400.

In an embodiment of the inventive concept, a manufacturing method of a window includes providing a base substrate including a flat area and at least one bent area adjacent the flat area; printing an ink composition on a face of the base substrate; and curing the printed ink composition, wherein the ink composition includes an acrylic resin including a polymerization of product of a first monomer having a hydroxyl group, a second monomer having an epoxy group, a third monomer having an acrylate group, and a fourth monomer having a substituted or unsubstituted phenyl group; a first curing agent having an isocyanate group; and a second curing agent having an amine group.

In an embodiment, the ink composition may further include an epoxy resin.

In an embodiment, the first monomer may be hydroxypropyl acrylate, the second monomer may be glycidyl methacrylate, glycidyl acrylate, or allyl glycidyl ether, or a combination thereof, the third monomer may be methyl methacrylate, and the fourth monomer may be benzyl methacrylate, styrene, or t-butyl styrene, or a combination thereof.

In an embodiment, the printing may be a process of transcribing the ink composition onto the base substrate using a rubber pad with a convex bottom

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
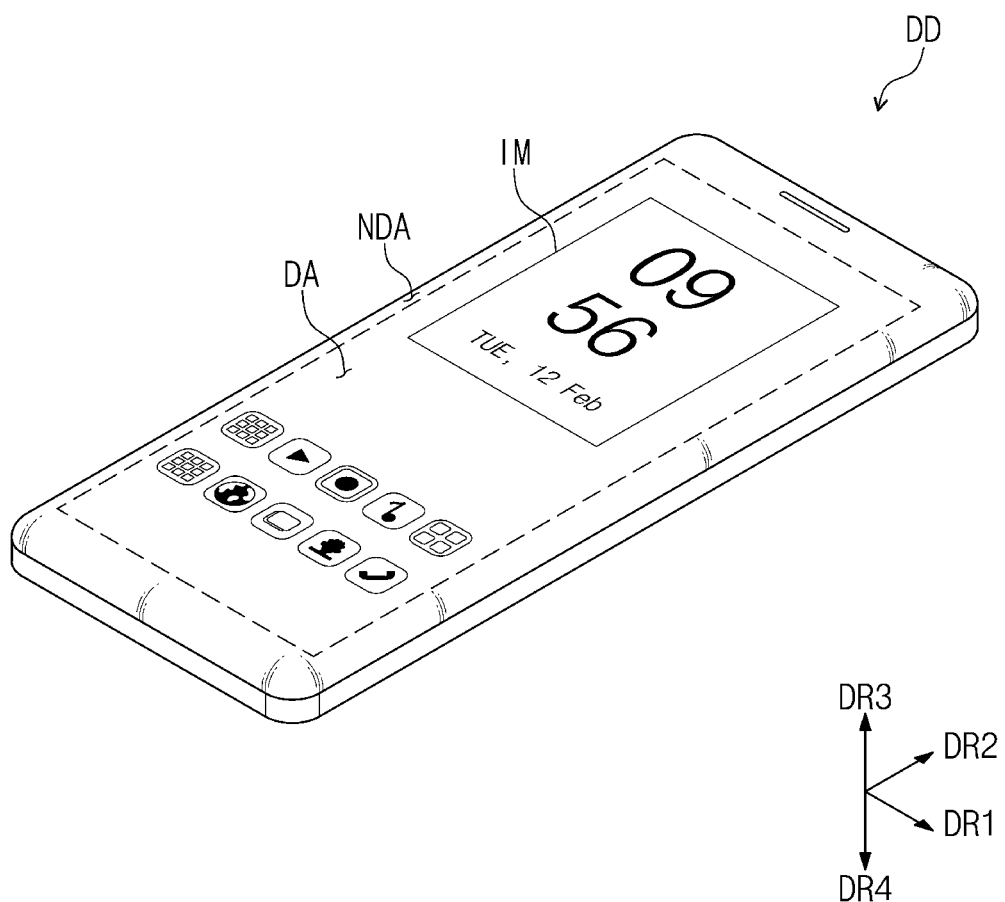
FIG. 1 is a perspective view of a display device according to an embodiment of the inventive concept.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element (or area, layer, part, etc.) is referred to as being "connected to" or "coupled to" another element, it can be connected or coupled to the other element or intervening elements or layers may be present. It is also understood that when an element is referred to as being "on" another element, it can be directly on the other element or intervening elements may be present therebetween. In contrast, when an element is referred to as being "directly on" another element, there are no intervening elements present.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Like numbers refer to like elements throughout. In addition, in the drawings, the thickness and the ratio and the dimension of the element are exaggerated for effective description of the technical contents.

The terminology used herein is for the purpose of describing particular embodiments only and is not intended to be limiting. As used herein, the singular forms "a," "an," and "the" are intended to include the plural forms, including "at least one," unless the content clearly indicates otherwise.

"At least one" is not to be construed as limiting "a" or "an." "Or" means "and/or." As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. For example, a first element discussed below could be termed a second element and similarly, a second element could be termed a first element without departing from the teachings of the present invention. Singular expression includes plural expressions unless meaning apparently different one in this context.

In addition, the terms such as "beneath", "below", "above", "upper" and the like, may be used herein for ease of description to describe relative relationship of elements as illustrated in the drawings. The terms have relative concept and may be explained on the basis of orientations depicted in the drawings.

It will be further understood that the terms "comprises", "comprising," "includes" and/or "including", when used in this specification, specify the presence of stated features, integers, steps, operations, elements, or components, but do not preclude the presence or addition of one or more other features, integers, steps, operations, elements, components, or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the disclosure, "—*" means a position connected with an adjacent part, and means a position connected with an adjacent polymerization unit in the disclosure.

In the disclosure, a monomer is differentiated from an oligomer and a polymer, and is a compound having a weight average molecular weight of about 1,000 grams/mole or less.

Hereinafter, an ink composition according to an embodiment of the inventive concept, a window printed with the ink composition, and a manufacturing method of the window will be explained.

The ink composition according to an embodiment of the inventive concept may include an acrylic resin, a first curing agent having an isocyanate group, and a second curing agent having an amine group.

Particularly, the acrylic resin according to an embodiment of the inventive concept includes a polymerization of product of a first monomer having a hydroxyl group, a second monomer having an epoxy group, a third monomer having an acrylate group, and a fourth monomer having a substituted or unsubstituted phenyl group. For example, the first monomer may be hydroxypropyl acrylate. The second monomer may be glycidyl methacrylate, glycidyl acrylate or allyl glycidyl ether, or a combination thereof. The third monomer may be methyl methacrylate. The fourth monomer may be benzyl methacrylate, styrene, or tert-butyl styrene, or a combination thereof.

In the acrylic resin formed by polymerizing the first monomer to the fourth monomer, a hydroxyl group, an epoxy group, an acylate group, and a substituted or unsubstituted phenyl group may be parts included in the side chains of the first monomer to the fourth monomer, respectively.

The first monomer according to an embodiment of the inventive concept may be represented by the following S1:

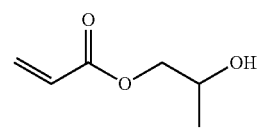

S1

The second monomer according to an embodiment of the inventive concept may be represented by S2-1, S2-2, or S2-3. For example, the second monomer may be glycidyl methacrylate.

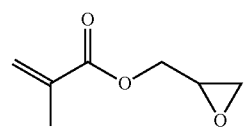

S2-1

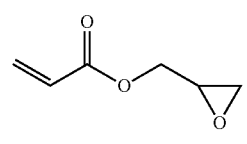

S2-2

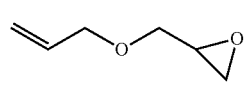

S2-3

The third monomer according to an embodiment of the inventive concept may be represented by the following S3:

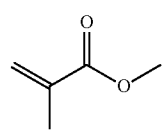

S3

The fourth monomer according to an embodiment of the inventive concept may be represented by S4-1, S4-2, or S4-3. For example, the fourth monomer may be benzyl methacrylate.

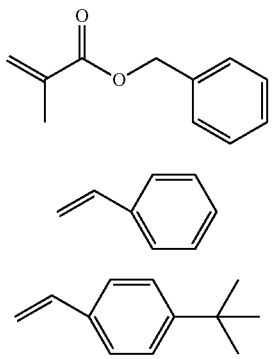

The acrylic resin according to an embodiment of the inventive concept may be polymerized by radical polymerization of the first monomer, the second monomer, the third monomer, and the fourth monomer. The acrylic resin included in the ink composition of an embodiment may be an acrylic polymer derived from repeating units including the first monomer the second monomer, then third monomer, and the fourth monomer.

The acrylic resin according to an embodiment of the inventive concept may be formed by polymerizing about 10 moles to about 30 moles of the first monomer, about 10 moles to about 20 moles of the second monomer, about 20 moles to about 35 moles of the third monomer and about 20 moles to about 35 moles of the fourth monomer, based on 100 moles of the acrylic resin. For example, an acrylic resin can be polymerized with a mole ratio of about 20 of the first monomer, a mole ratio of about 20 of the second monomer, a mole ratio of about 30 of the third monomer and a mole ratio of about 30 of the fourth monomer, to produce the acrylic resin.

The acrylic resin according to an embodiment of the inventive concept may include a hydroxyl group and an epoxy group. The acrylic resin included in the ink composition according to an embodiment may include the hydroxyl group and the epoxy group in side chains at the same time. For example, the acrylic resin according to an embodiment may be represented by the following Formula 1:

Formula 1

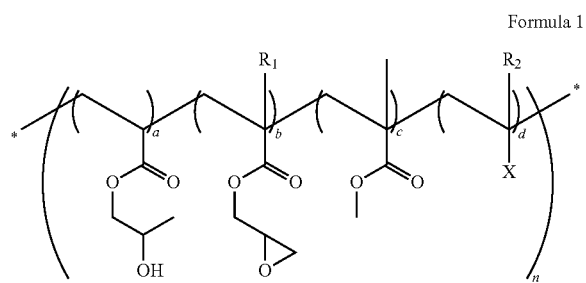

In Formula 1, "a", "c" and "d" are each independently an integer of 1 to 3, "b" may be 1 or 2. In Formula 1, "a" to "d" correspond to the numbers of the repeating units of the first monomer, the second monomer, the third monomer, and the fourth monomer, respectively. For example, the acrylic resin may be formed by repeating the first monomer twice, the second monomer twice, the third monomer three times, and the fourth monomer three times.

X may be

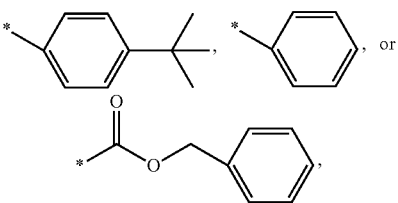

and for example, X may be

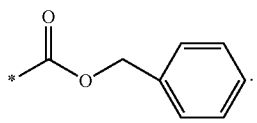

$R_1$ and $R_2$ are each independently hydrogen or a methyl group. For example, $R_1$ may be a methyl group. For example, $R_2$ may be a methyl group.

In Formula 1, "n" may be in integer of 200 to 400.

The acrylic resin of the ink composition according to an embodiment of the inventive concept may be a polymer resin having a weight average molecular weight of about 20,000 grams/mole to about 40,000 grams/mole. For example, the acrylic resin of the ink composition according to an embodiment may have a weight average molecular weight of about 20,000 grams/mole to about 30,000 grams/mole such as from about 26,000 grams/mole to about 29,500 grams/mole.

The first curing agent of the ink composition according to an embodiment of the inventive concept may be a compound having an isocyanate group. Particularly, the first curing agent may have a plurality of isocyanate groups. For example, the first curing agent may be isophorone diisocyanate, toluene diisocyanate, or hexamethylene diisocyanate, which has two isocyanate groups.

The first curing agent of the ink composition according to an embodiment of the inventive concept may undergo cross-linking reaction with the hydroxyl group of the acrylic resin. The first curing agent may cure the ink composition by combining the hydroxyl groups of two first monomers which are connected to different main chains from each other.

The ink composition according to an embodiment, the first curing agent may include a blocked isocyanate group in which a reactive group of the isocyanate is protected. The use of the protected isocyanate is to inhibit the reaction between the first curing agent and the second curing agent because the reaction rate between the first curing agent and the second curing agent is greater than the reaction rate between the first curing agent or the second curing agent, and the hydroxyl group and the epoxy group of the acrylic resin, respectively.

Particularly, hexamethylene diisocyanate may be the first curing agent having a blocked isocyanate group with a protected reactive group.

For example, according to an embodiment of the inventive concept, if the ink composition is printed on a base substrate BS (FIGS. 3A and 3B) and cured at a high temperature, the protecting group of the first curing agent may be cleaved and the reaction rate of the ink composition may be similar at the high temperature, and thus, a cross-linking reaction may occur.

The second curing agent of the ink composition according to an embodiment of the inventive concept may be a curing agent having an amine group. Particularly, the second curing agent may have two or more amine groups. For example, the second curing agent may be diethylenetriamine or triethylenetetramine.

The second curing agent of the ink composition according to an embodiment of the inventive concept may undergo crosslinking reaction with the epoxy group of the acrylic resin. The second curing agent may cure the ink composition through the reaction with the epoxy groups of two second monomers of two different main chains resulting in the crosslinking of the two main chains.

The ink composition according to an embodiment of the inventive concept may include an acrylic resin including a polymerization of product of a first monomer having a hydroxyl group, a second monomer having an epoxy group, a third monomer having an acrylate group, and a fourth monomer having a substituted or unsubstituted phenyl group, a first curing agent having an isocyanate group and a second curing agent having an amine group.

The ink composition according to an embodiment of the inventive concept may further include an epoxy resin so that a printed layer PL (FIGS. 3A and 3B) has a high crosslinking density. Particularly, the epoxy resin may be a compound including one or more epoxidized aromatic rings. For example, the epoxy resin may be an epoxy resin of a bisphenol A type. Particularly, the epoxy resin may be added to about 12.5 parts by weight to about 25 parts by weight based on 100 parts by weight of the acrylic resin. The added epoxy resin controls the crosslinking density in the ink composition, to improve the strength, durability, and surface hardness of a coated layer after curing the ink composition, and can also enhance adhesiveness.

The ink composition according to an embodiment of the inventive concept may further include a pigment such as carbon black, a carbon black dispersant, a defoaming agent, an isophorone solvent, and a barium sulfate filler. Particularly, the carbon black dispersant plays the role of dispersing the carbon black pigment uniformly in the ink, and may be an amine-based dispersant. The defoaming agent plays the role of breaking bubbles formed in the composition to prevent the generation of appearance defects during the formation of a coated layer, and may be a silicon-based defoaming agent. The barium sulfate filler controls the viscosity of the ink composition and may prevent cracking during the formation of a coated layer.

Hereinafter, the window according to an embodiment of the inventive concept and the manufacturing method of the window will be explained referring to drawings.

Figure 2:
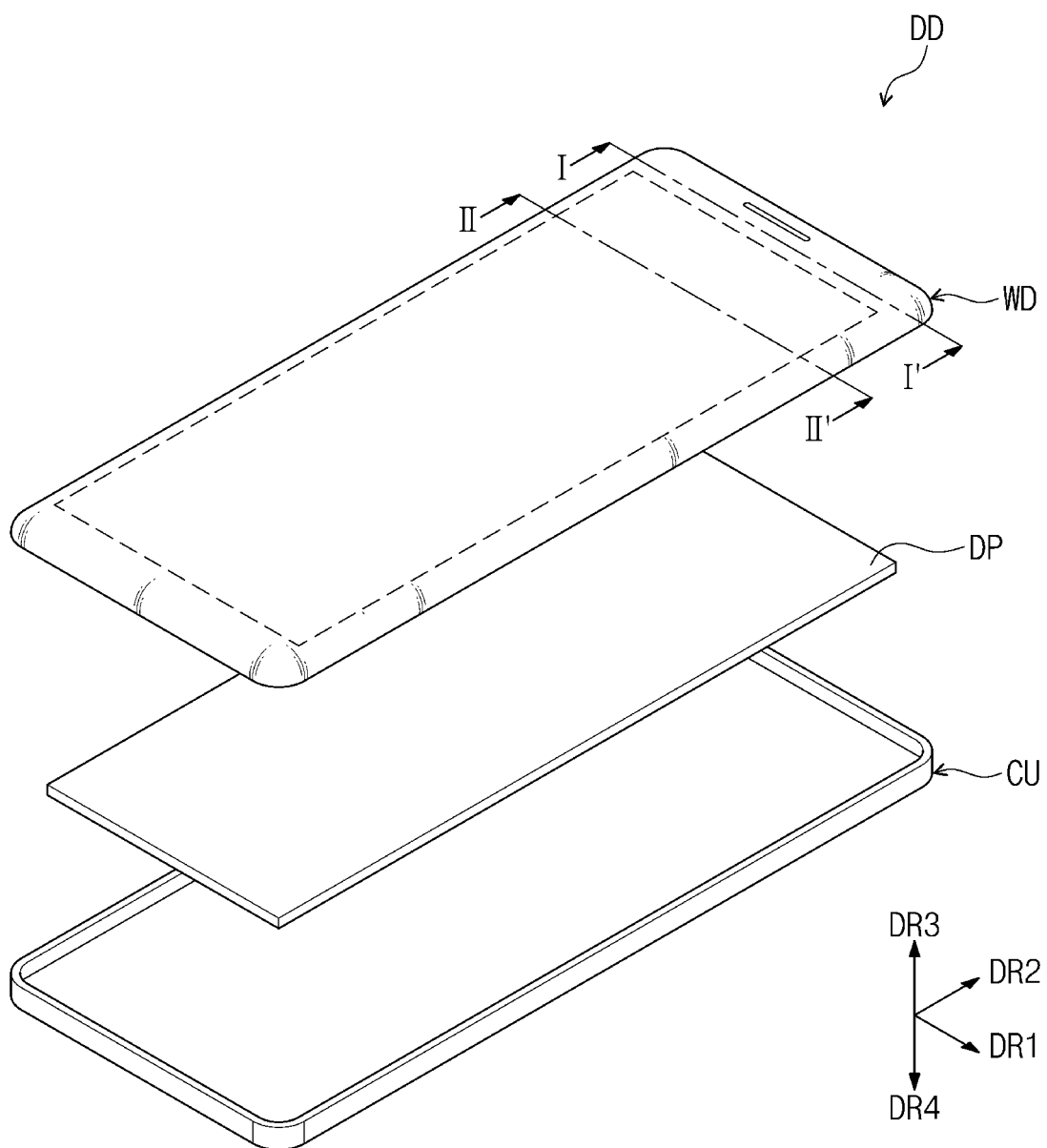
FIG. 2 is an exploded perspective view of the display device shown in FIG. 1.
Figure 3A:
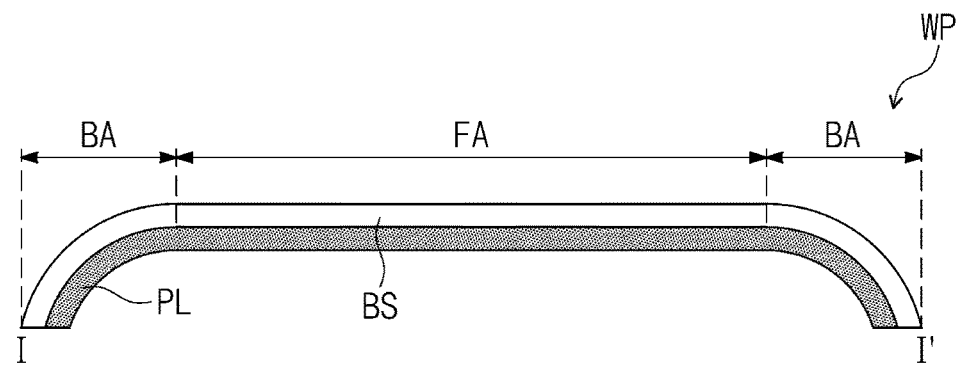
FIG. 3A is a cross-sectional view cut along line I-I' in FIG. 2.
Figure 3A:
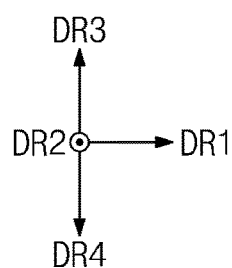
Figure 3B:
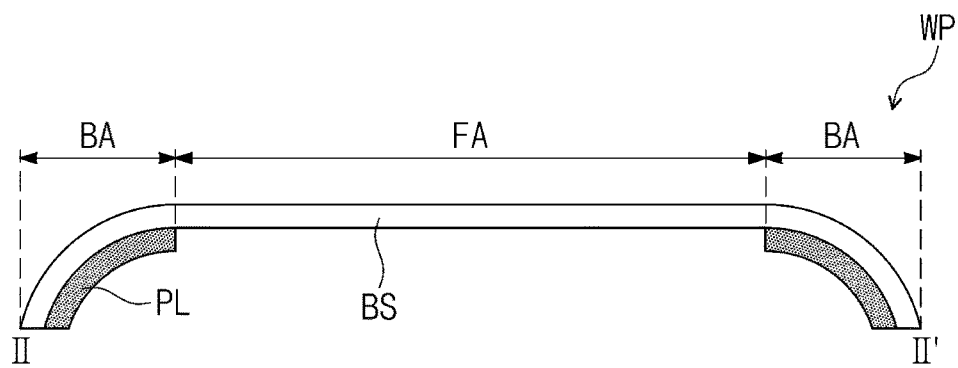
FIG. 3B is a cross-sectional view cut along line II-II' in FIG. 2.
Figure 3B:
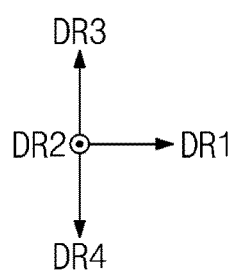
Figure 4:
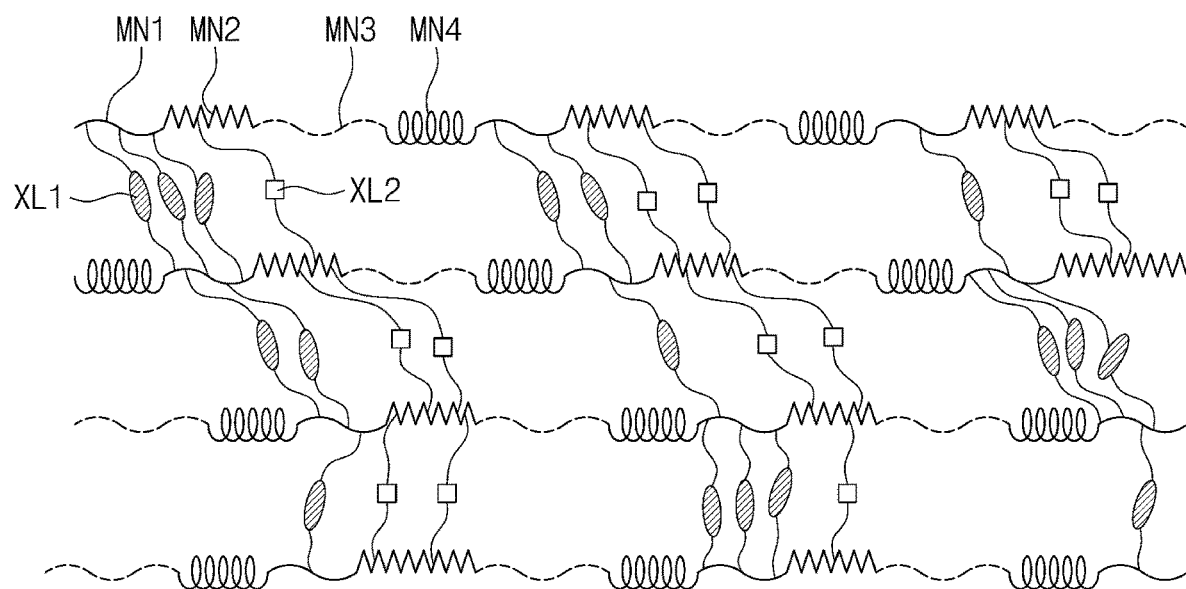
FIG. 4 shows a crosslinked state formed after printing an ink composition according to an embodiment of the inventive concept.

FIG. 1 is a perspective view of a display device DD according to an embodiment of the inventive concept. FIG. 2 is an exploded perspective view of the display device DD shown in FIG. 1. FIG. 3A is a cross-sectional view cut along line I-I' in FIG. 2. FIG. 3B is a cross-sectional view cut along line II-II' in FIG. 2. FIG. 4 schematically shows a crosslinked state formed after printing an ink composition according to an embodiment of the inventive concept.

FIG. 3A is a cross-sectional view cut along line I-I' in FIG. 2. Line I-I' is a cut line corresponding to a non-display area NDA in FIG. 2, and a printed layer PL may be disposed on both a flat area FA and a bent area BA in the non-display area NDA. FIG. 3B is a cross-sectional view cut along line II-II' in FIG. 2. Line II-II' corresponds to a cut line of a window including both a display area DA and a non-display area NDA. In FIG. 3B, the printed layer PL is mainly disposed in the non-display area NDA.

In FIG. 1, a portable terminal provided with bent four edges is shown as an embodiment of a display device DD. However, an embodiment of the inventive concept is not limited thereto, but may be applied to various display devices such as a curved display device, a bending-type display device, a rollable display device, a foldable display device and a stretchable display device. In addition, though not shown separately, the display device DD according to the inventive concept may be used in a small and medium-size electronic device such as a personal computer, a notebook computer, a personal digital terminal, a car navigation unit, a game console, a portable electronic device, a wristwatch-style electronic device and a camera, as well as a large-size electronic device such as a television and an outdoor billboard. These are suggested only for illustration, and the application to another electronic device is of course allowed as long as it is not deviated from the inventive concept.

The display device DD includes a plurality of areas which are divided on a display surface. The display device DD may include a display area DA displaying image IM, and a non-display area NDA which is adjacent to the display area DA. The display surface displaying the image IM is in parallel to a plane defined by a first direction DR1 and a second direction DR2, and a normal direction of the display surface is indicated by a third direction DR3. The third direction DR3 and a fourth direction DR4 are base axes defining the front surface and rear surface of members, respectively. In the disclosure, a plane defined by the first direction DR1 and the second direction DR2 is defined as a planar plane.

The ink composition according to an embodiment may be provided for forming the printed layer PL which is provided on a window WD of the display device DD. The ink composition according to an embodiment of the inventive concept may be printed in the non-display area NDA of the display device DD to form a pattern.

Referring to FIG. 2, the display device DD may include a display panel DP, a window WD, and a housing CU.

The display panel DP may be adopted in various types such as an organic light emitting display panel, a quantum dot light emitting display panel, a liquid crystal display panel, a plasma display panel, an electrophoresis display panel, and an electrowetting display panel.

The window WD according to an embodiment of the inventive concept may be disposed on the display panel DP. In an embodiment, the window WD may include a glass substrate.

A housing CU according to an embodiment of the inventive concept receives the display panel DP and may be combined with the window WD. The housing CU may be obtained by assembling a plurality of parts, or may include one injection molded body. The housing CU may include glass, plastic, or metal.

Referring to FIGS. 3A and 3B, the window WD includes a base substrate BS which includes a flat area FA and at least one bent area BA neighboring, i.e., adjacent the flat area FA, and may include a printed layer PL, which is obtained by printing an ink composition on a face of the base substrate BS. For example, the printed layer PL may be formed on the bottom of the base substrate BS.

The base substrate BS may be a glass substrate, a metal substrate, a plastic substrate, etc. However, an embodiment of the inventive concept is not limited thereto, and the base substrate BS may be an inorganic layer, an organic layer, or a composite material layer. Particularly, the base substrate BS may be a glass substrate or a reinforced glass substrate.

The printed layer PL may be formed using the ink composition of an embodiment. As depicted in FIG. 4, the ink composition may include an acrylic resin including a polymerization of product of a first monomer MN1 having a hydroxyl group, a second monomer MN2 having an epoxy group, a third monomer MN3 having an acrylate group, and a fourth monomer MN4 having a substituted or unsubstituted phenyl group, a first curing agent XL1 having an isocyanate group, and a second curing agent XL2 having an amine group.

With respect to the ink composition for forming the printed layer PL, the same explanation on the above-described ink composition of an embodiment may be applied.

FIG. 4 schematically shows a crosslinked state of an ink composition, and the window WD may include a printed layer PL in a cured state of the ink composition, as shown in FIG. 4. Referring to FIG. 4, the first monomer MN1 including a hydroxyl group may be combined with an adjacent first monomer MN1 through the first curing agent XL1 to be crosslinked and may serve one or more bonds. The second monomer MN2 including an epoxy group may be crosslinked through the second curing agent XL2. The crosslinked state is shown on a plane in FIG. 4, but the crosslinked bond formed by the first curing agent XL1 and the second curing agent XL2 may be formed three-dimensionally. That is, different from the drawing, the crosslinked bond through the first curing agent XL1 and the crosslinked bond through the second curing agent XL2 may intersect with each other, and the structure is not limited to the drawing.

Figure 5:
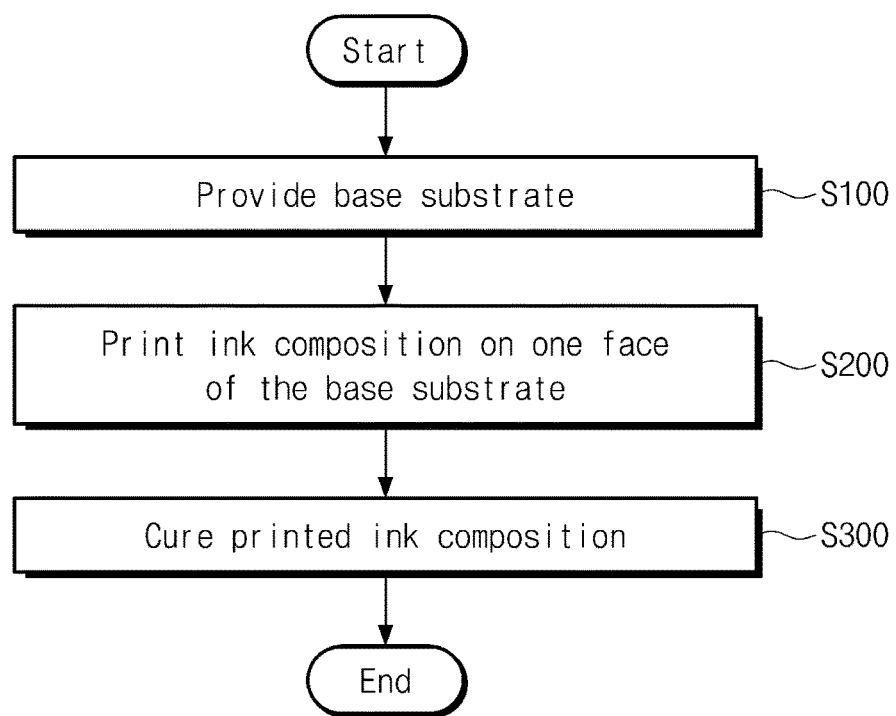
FIG. 5 is a flowchart showing a manufacturing method of a window according to an embodiment of the inventive concept.

FIG. 5 is a flowchart showing a manufacturing method of a window according to an embodiment of the inventive concept. FIGS. 6A through 6D show a method of printing an ink composition according to an embodiment of the inventive concept on a window in order. Hereinafter, the manufacturing method of a window according to an embodiment of the inventive concept will be explained with reference to FIGS. 5 and 6A, 6B, 6C, and 6D.

Figure 6A:
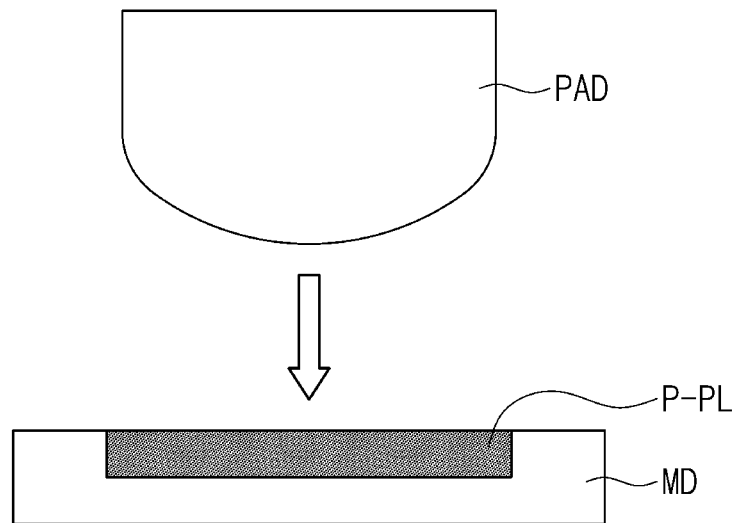
FIGS. 6A, 6B, 6C, and 6D show a method of printing an ink composition according to an embodiment of the inventive concept on a window in order.
Figure 6B:
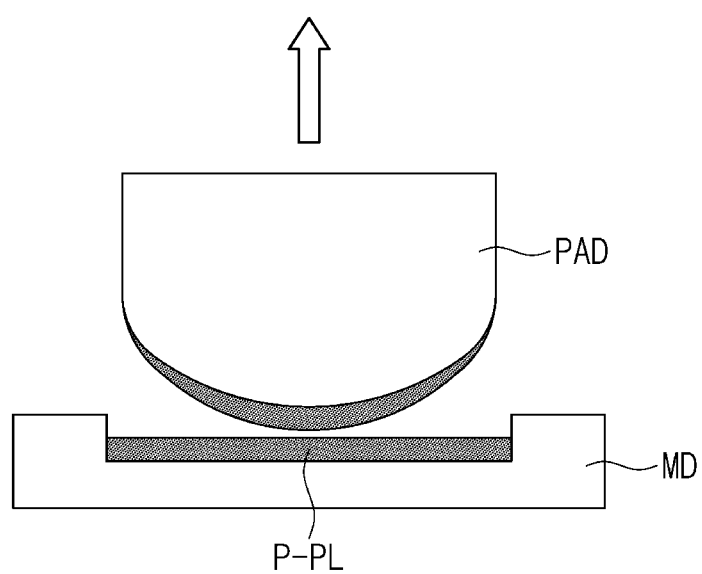

Referring to FIG. 5, the manufacturing method of the window WD according to an embodiment of the inventive concept includes providing a base substrate (S100), printing an ink composition on one face of the base substrate (S200), and curing the printed ink composition (S300). Particularly, in the printing of the ink composition on one face of the base substrate (S200), a pattern may be formed on the base substrate. Particularly, the providing of the base substrate (S100) includes a process of providing a base substrate including a flat area FA (FIG. 3A) and at least one bent area BA (FIG. 3A) neighboring, i.e., adjacent the flat area FA (FIG. 3A). The printing of the ink composition on one face of the base substrate (S200) may include a process of printing an ink composition on one face of the base substrate by a pad printing method using a rubber pad PAD as depicted in FIG. 6A.

Figure 6C:
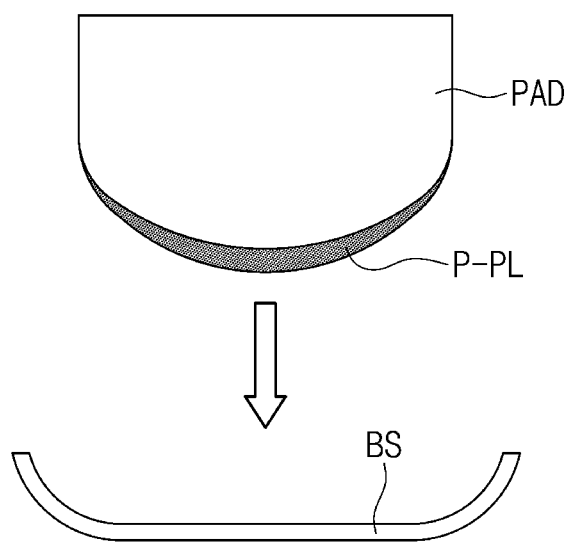
Figure 6D:
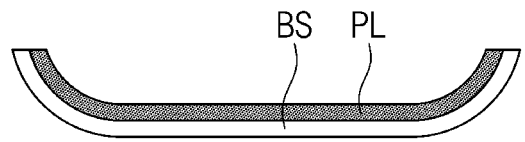

Referring to FIGS. 6A, 6B, 6C, and 6D, on the base substrate BS of the window WD, a printed layer may be formed using an ink composition by a pad printing method. An ink composition P-PL is transcribed from an ink mold MD to a rubber pad PAD according to FIGS. 6A and 6D. Referring to FIG. 6C and FIG. 6D, the ink composition P-PL is transcribed on one face of the base substrate BS using the rubber pad PAD to form a printed layer PL. The process of curing the printed ink composition P-PL may include a process of curing the ink composition at a high temperature of about 140° C. to about 160° C. for about 30 minutes. Hereinafter, the ink composition according to an embodiment of the inventive concept will be explained in particular together with the Examples and Comparative Examples referring to the Examples and Comparative Examples. The Examples are only illustrations to assist the understanding of the inventive concept, and the inventive concept should not be construed as limited to the embodiments set forth herein.

EXAMPLES

1. Polymerization of Acrylic Resin

A polymerization method of the acrylic resin according to this embodiment will be illustrated and explained in more technical detail below. In addition, the polymerization method of the acrylic resin described hereinafter is an embodiment, and the polymerization method according to exemplary embodiments of the inventive concept is not limited to the embodiments described below.

(Polymerization Example of Acrylic Resin)

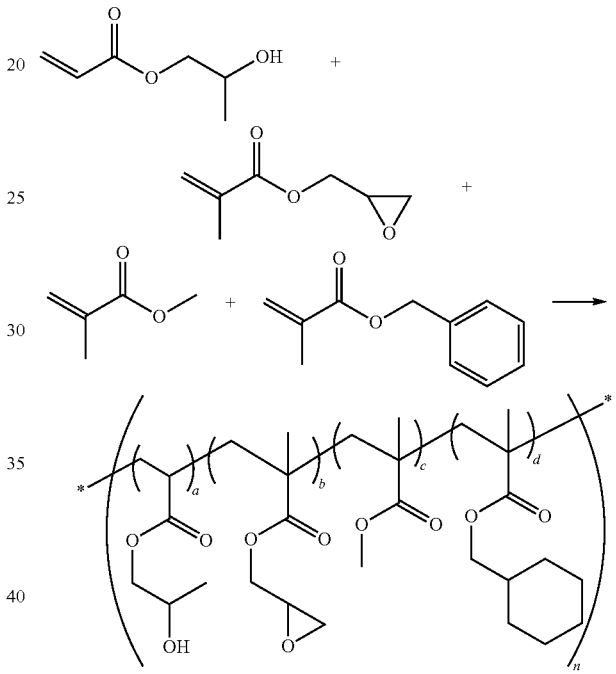

To a round-bottom flask (2 L), 75 g of a solvent ethyl carbitol acetate (ECA) was added and a temperature of about 80° C. was maintained. Hydroxypropyl acrylate (HPA) was used as the first monomer, glycidyl methacrylate was used as the second monomer, methyl methacrylate was used as the third monomer, and benzyl methacrylate was used as the fourth monomer.

The first monomer to the fourth monomer (total 750 g) were mixed in a corresponding ratio as indicated in Table 1, and azobisisobutyronitrile (AIBN) was added and the mixture was stirred. The amount of AIBN was about 0.2 mole percent of the total number of moles of the monomers (with a theoretical polymerization degree of 250). A mixture of the monomers with the initiator was added to the heated (80° C.) solvent/flask drop by drop over about 2 hours. After adding the entire quantity of the mixture, the reaction was maintained for about 4 hours at 80° C., then upon cooling the reaction mixture is filtered, and a product was collected. This product corresponded to an acrylic resin to be included in an ink composition of an embodiment.

In Table 1 below, the mole ratio of the monomers and the molecular weight of the acrylic resin formed by the above-described polymerization method are shown.

TABLE 1

| Division | Monomer ratio (mole ratio) | | | | Molecular weight (MW, g/mole) |
|---|---|---|---|---|---|
| | HPA | GMA | MMA | BA | |
| Example A | 10 | 20 | 35 | 35 | 27,350 |
| Example B | 20 | 20 | 30 | 30 | 26,850 |
| Example C | 30 | 20 | 25 | 25 | 28,690 |
| Example D | 20 | 40 | 20 | 20 | 27,385 |

Table 1 shows the results on the molecular weight of the acrylic resin polymerized according to the mole ratio of the first monomer to the fourth monomer. The weight average molecular weights of the acrylic resins represented by Example A to Example D satisfy a range of about 20,000 g/mole to about 30,000 g/mole.

2. Evaluation of Ink Composition

The physical properties of the ink composition including the acrylic resin polymerized by the above-described polymerization method of an acrylic resin were evaluated. In the ink composition used for evaluation, in addition to one of the acrylic resins Examples A to D above, hexamethylene-diisocyanate (HDI) was used as the first curing agent, and diethylenetriamine (DETA) was used as the second curing agent.

In an embodiment further including an epoxy resin in addition to one of the acrylic resins, Ex. 4 to 10 and CE 4, of the ink composition, a bisphenol A type epoxy resin was used as the epoxy resin. The epoxy resin has a weight average molecular weight about 200 grams/mole.

The physical properties of the ink composition were investigated by the usability or workability of the ink composition based on three physical properties of interest including available time, alcohol rubbing, and pad printing properties of the ink composition.

The available time is time required for increasing a viscosity after adjusting an initial viscosity to about 600 centipoise (cps) to about 1,000 cps according to the generation of curing reaction at room temperature. An ink composition with a viscosity of about 1,000 cps or more is not applicable (not workable) for printing, and an ink composition maintaining a viscosity of about 1000 cps or less for about 5 hours or more is acceptable.

Alcohol rubbing is standard for evaluating the strength and crosslinking density of a printed layer formed using an ink composition. Accordingly, ink evaluations were conducted by printing an ink composition on a glass substrate, curing at about 150° C., standing for about 24 hours, and then, measuring the rubbing number required for the complete exfoliation of the printed layer by using an alcohol rubbing machine under about 1,000 grams load conditions. It was decided to be acceptable if the rubbing number was 150 or more.

The pad printing properties were investigated by carrying out pad printing in a state where a viscosity of an ink composition was about 600 cps, and the sharpness of the printed outer line was evaluated by the naked eye.

TABLE 2

| | Compounding information | | | | | | | Physical properties of interest | | |
|---|---|---|---|---|---|---|---|---|---|---|
| | Acrylic resin 80 g (solid content 50%) | | | | | Blocked IsoCN[a] | DETA | | | |
| | Monomer ratio (mole ratio) | | | | Epoxy resin | Acrylic curing agent | Epoxy curing agent | Available Time Hour | Alcohol rub No. | Pad printing Sharp |
| Division | HPA | GMA | MMA | BA | | | | | | |
| Ex. 1 | 20 | 20 | 30 | 30 | 0 | 15 g | 0.5 g | 15 | 70 | OK |
| Ex. 2 | 20 | 20 | 30 | 30 | 0 | 15 g | 1 g | 10 | 100 | OK |
| Ex. 3 | 20 | 20 | 30 | 30 | 0 | 15 g | 2 g | 8 | 70 | OK |
| Ex. 4 | 20 | 10 | 35 | 35 | 20 g | 15 g | 4 g | 6 | 150 | OK |
| Ex. 5 | 20 | 20 | 30 | 30 | 20 g | 15 g | 4 g | 5 | 250 | OK |
| Ex. 6 | 10 | 20 | 20 | 20 | 20 g | 8 g | 4 g | 5 | 150 | OK |
| Ex. 7 | 20 | 20 | 30 | 30 | 20 g | 15 g | 4 g | 5 | 250 | OK |
| Ex. 8 | 30 | 20 | 25 | 25 | 20 g | 22 g | 4 g | 5 | 280 | OK |
| Ex. 9 | 20 | 20 | 30 | 30 | 10 g | 15 g | 2 g | 7 | 150 | OK |
| Ex. 10 | 20 | 20 | 30 | 30 | 20 g | 15 g | 4 g | 5 | 250 | OK |
| CE 1 | 20 | 20 | 60 | 0 | 0 | 15 g | 0 | infinite | 30 | OK |
| CE 2 | 20 | 20 | 0 | 60 | 0 | 15 g | 0 | infinite | 60 | Δ |
| CE 3 | 20 | 20 | 30 | 30 | 0 | 15 g | 0 | infinite | 50 | OK |
| CE 4 | 20 | 0 | 40 | 40 | 20 g | 15 | 4 g | 7 | 50 | OK |

[a] Blocked Isocyanate

Referring to the results of Table 2, and considering the three physical properties of interest, each of the properties of the ink compositions were found to be acceptable in Example 1 to Example 10. On the contrary, alcohol rubbing was markedly inferior, or pad printing properties were unsatisfactory in Comparative Example 1 to Comparative Example 3. In particular, the ink compositions of Example 1, Example 2, and Example 3 included only the acrylic resin, i.e., no epoxy, and as the amount of the second curing agent is increased, the available time was shown to decrease.

Example 4 and Example 5 correspond to ink compositions including acrylic resin in which the amount of the second monomer GMA is increased by a mole ratio of 10 and the amount of MMA and BA are each decreased by a mole ratio of 5, based on 100 moles of the acrylic resin. With the increase of GMA, the available time gradually decreased and the number of alcohol rubbing increased significantly.

In Example 6 to Example 8, the physical properties were measured as the amount of GMA (the second monomer) was held constant at about a 20 mole ratio, based on 100 moles of the acrylic resin and varying the amount of HPA (the first monomer) from a 10 to 30 mole ratio, based on 100 moles of the acrylic resin. As a result, since HPA did not react with the blocked isocyanate at room temperature, the available time was not affected (available time was determined by only epoxy), and the number of alcohol rubbing was acceptable with the increase of HPA. Moreover, there was no significant change in pad printing properties. In this experiment, the evaluation was conducted to the ratio of about 30 moles based on 100 mole of the acrylic resin.

In Example 9 and Example 10, the physical properties were measured by varying the amount of the epoxy resin. With the increase of the epoxy resin, the number of alcohol rubbing significantly increased, but the available time decreased and the sharpness of the pad printing degraded. As a result, the amount of the epoxy resin was limited to about 25 g based on 80 g of the acrylic resin (solid content of 50 percent by weight).

In conclusion, the amount of HPA in the acrylic resin is appropriately about a mole ratio of 30 or less, the amount of GMA is appropriately about a mole ratio of 20 or less, based on 100 moles of the acrylic resin, and the mixing amount of the epoxy resin is appropriately from about 12.5 parts by weight to about 25 parts by weight based on 100 parts by weight of the acrylic resin (solid content of 50 percent by weight).

In the ink composition according to an embodiment of the inventive concept, the appropriate mole ratio of the first monomer is from about 10 to about 30, and the appropriate mole ratio of the second monomer is from about 10 to about 20, based on 100 moles of the acrylic resin.

The ink composition according to an embodiment of the inventive concept includes an acrylic resin, a first curing agent having an isocyanate group, and a second curing agent having an amine group, and thus may have improved printing properties and reliability. Particularly, the acrylic resin according to an embodiment of the inventive concept includes a polymerization of product of a first monomer having a hydroxyl group, a second monomer having an epoxy group, a third monomer having an acrylate group, and a fourth monomer having a substituted or unsubstituted phenyl group, and may have improved chemical resistance and abrasion resistance.

The window according to an embodiment of the inventive concept may include a printed layer having improved chemical resistance and abrasion resistance by using the ink composition.

In addition, the manufacturing method of the window according to an embodiment of the inventive concept may provide a window on which a printed layer having improved chemical resistance and abrasion resistance is formed.

The ink composition according to an embodiment includes an acrylic resin including a polymerization of product of a first monomer having a hydroxyl group, a second monomer having an epoxy group, a third monomer having an acrylate group, and a fourth monomer having a substituted or unsubstituted phenyl group, a first curing agent having an isocyanate group, and a second curing agent having an amine group, and may have improved printing properties and reliability.

The window according to an embodiment includes a printed layer formed using an ink composition that may show improved chemical resistance and abrasion resistance.

According to the manufacturing method of a window using the ink composition according to an embodiment, a printed layer having improved printing properties and reliability can be achieved.

Although the exemplary embodiments of the present invention have been described, it is understood that the present invention should not be limited to these exemplary embodiments, but various changes and modifications can be made by one ordinary skilled in the art within the spirit and scope of the present invention as hereinafter claimed.

What is claimed is:

1. A window comprising:
a base substrate comprising a flat area and at least one bent area adjacent the flat area; and
a printed layer disposed on one face of the base substrate and formed with an ink composition,
wherein the ink composition comprises:
an acrylic resin comprising a polymerization product of a first monomer having a hydroxyl group, a second monomer having an epoxy group, a third monomer having an acrylate group, and a fourth monomer having a substituted or unsubstituted phenyl group;
an epoxy resin;
a first curing agent having an isocyanate group; and
a second curing agent having an amine group,
wherein a solid content of the epoxy resin is present in the ink composition in about 12.5 parts by weight to about 25 parts by weight based on 100 parts by weight (solid content) of the acrylic resin.

2. The window of claim 1, wherein
the first monomer is hydroxypropyl acrylate,
the second monomer is glycidyl methacrylate, glycidyl acrylate, allyl glycidyl ether, or a combination thereof,
the third monomer is methyl methacrylate, and
the fourth monomer is benzyl methacrylate, styrene, t-butyl styrene, or a combination thereof.

3. The window of claim 2, wherein
the first curing agent comprises two or more isocyanate groups, and
the second curing agent comprises two or more amine groups.

4. The window of claim 1, comprising, based on 100 moles of the acrylic resin,
from about 10 moles to about 30 moles of the first monomer;
from about 10 moles to about 20 moles of the second monomer;
from about 20 moles to about 35 moles of the third monomer; and
from about 20 moles to about 35 moles of the fourth monomer.

5. The window of claim 1, wherein the acrylic resin is represented by the following Formula 1:

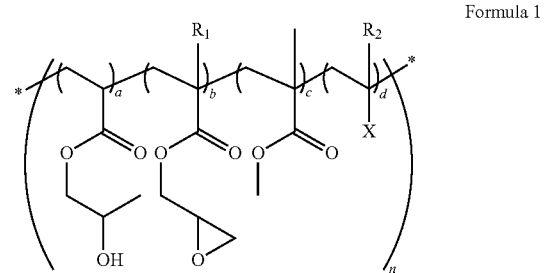

Formula 1 in Formula 1,
"a", "c", and "d" are each independently an integer of 1 to 3,
"b" is 1 or 2,
X is

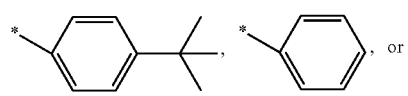

-continued

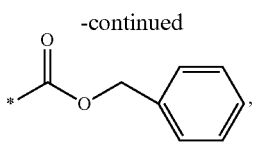

$R_1$ and $R_2$ are each independently hydrogen or a methyl group, and
"n" is an integer of 200 to 400.

6. A manufacturing method of a window, the method comprising:
providing a base substrate comprising a flat area and at least one bent area adjacent the flat area;
printing an ink composition on a face of the base substrate; and
curing the printed ink composition,
wherein the ink composition comprises:
an acrylic resin comprising a polymerization of product of a first monomer having a hydroxyl group, a second monomer having an epoxy group, a third monomer having a acrylate group, and a fourth monomer having a substituted or unsubstituted phenyl group;
an epoxy resin;
a first curing agent having an isocyanate group; and
a second curing agent having an amine group,
wherein a solid content of the epoxy resin is present in the ink composition in about 12.5 parts by weight to about 25 parts by weight based on 100 parts by weight (solid content) of the acrylic resin.

7. The manufacturing method of a window of claim 6, wherein the ink composition further comprises an epoxy resin.

8. The manufacturing method of a window of claim 6, wherein
the first monomer is hydroxypropyl acrylate,
the second monomer is glycidyl methacrylate, glycidyl acrylate, allyl glycidyl ether, or a combination thereof,
the third monomer is methyl methacrylate, and
the fourth monomer is benzyl methacrylate, styrene, t-butyl styrene, or a combination thereof.

9. The manufacturing method of a window of claim 6, wherein the printing is a process of transcribing the ink composition onto the base substrate using a rubber pad with a convex bottom.

10. A window comprising:
a base substrate comprising a flat area and at least one bent area adjacent the flat area; and
a printed layer disposed on one face of the base substrate and formed with an ink composition,
wherein the cured ink composition comprises:
an acrylic resin comprising a polymerization product of a first monomer having a hydroxyl group, a second monomer having an epoxy group, a third monomer having an acrylate group, and a fourth monomer having a substituted or unsubstituted phenyl group;
a first curing agent having an isocyanate group; and
a second curing agent having an amine group,
wherein the ink composition includes: from about 10 moles to about 30 moles of the first monomer; from about 10 moles to about 20 moles of the second monomer; from about 20 moles to about 35 moles of the third monomer; and from about 20 moles to about 35 moles of the fourth monomer.

11. The window of claim 10, wherein the ink composition further comprises an epoxy resin.

12. The window of claim 10, wherein
the first monomer is hydroxypropyl acrylate,
the second monomer is glycidyl methacrylate, glycidyl acrylate, allyl glycidyl ether, or a combination thereof,
the third monomer is methyl methacrylate, and
the fourth monomer is benzyl methacrylate, styrene, t-butyl styrene, or a combination thereof.

13. The window of claim 11, wherein a solid content of the epoxy resin is present in the ink composition in about 12.5 parts by weight to about 25 parts by weight based on 100 parts by weight (solid content) of the acrylic resin.

* * * * *